Oct. 15, 1957  T. H. HINCHCLIFFE  2,809,743
BELT CLEAT SUPPORTS
Filed July 13, 1953
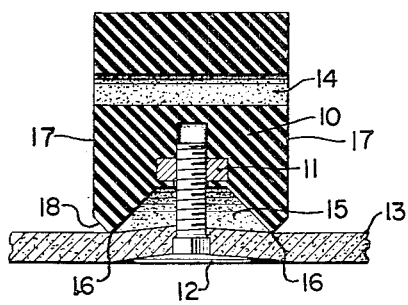
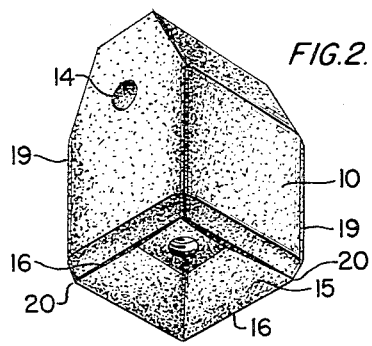
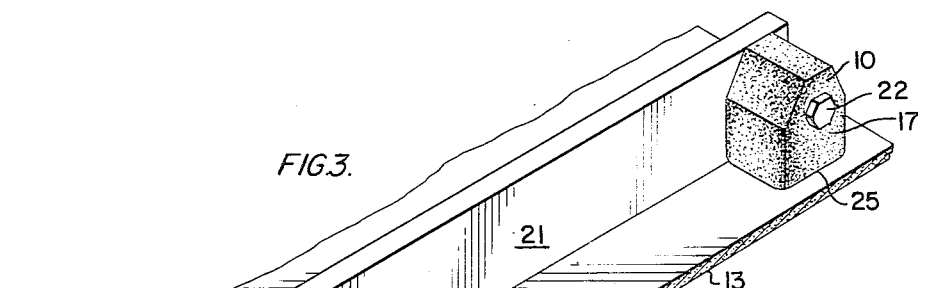
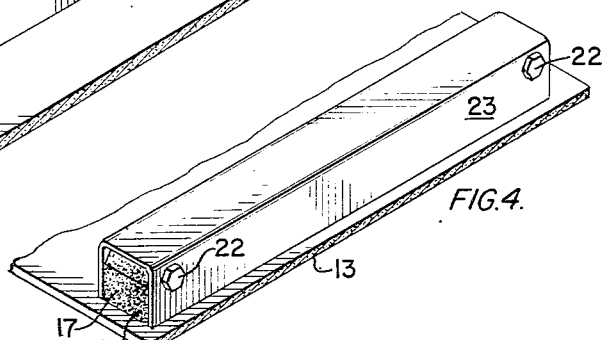
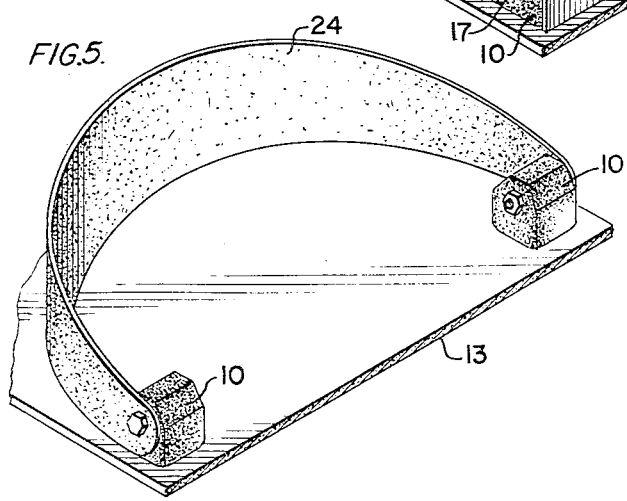
THEODORE H. HINCHCLIFFE,
INVENTOR.

… … … …

United States Patent Office 2,809,743
Patented Oct. 15, 1957

2,809,743

BELT CLEAT SUPPORTS

Theodore H. Hinchcliffe, Pasadena, Calif.

Application July 13, 1953, Serial No. 367,476

2 Claims. (Cl. 198—199)

This invention relates to improvements in belt conveyors and particularly to means for supporting transversely disposed cleats thereon.

In the common practice of assembling conveyor belts as used in agricultural, milling and various manufacturing processes, it is customary to provide variously shaped cleats fastened directly to the belt by means of bolts or other similar fastenings. These cleats are generally made of metal or wood or such other inflexible material and therefore can not bend or yield when passing around or over the rollers or pulleys on which the belt is suspended. This inflexibility results in a wearing and enlargening of the bolt holes which not only results in a progressive weakening of the belt, but allows the cleat to tilt away from the belt surface. This tilting soon results in an ever enlargening crack between the base of the cleat and the belt surface so that portions of the material being conveyed may lodge therein. It is obvious that in food handling apparatus, such collection of material under the cleat would be highly undesirable and unsanitary.

The primary object of my invention, therefore, is to supply a belt cleat support which, in itself, will obviate the above mentioned disadvantages and will provide the means of mounting a cleat which also will not be subject to the same objectionable features as found in such devices of the prior art.

Another object of my invention is to furnish a device which may be used with facility in the field and enable the individual user of conveying machinery to fabricate his own cleats to satisfy his particular needs.

A further object of my invention is to provide means whereby the cleats of a conveyor belt may be secured thereto with the maximum protection against undue wear and tear of said belt.

A still further object of my invention is to provide means whereby transverse cleats may be secured to conveyor belts in such a manner as to provide maximum sanitation in food handling machinery.

Another object of my invention is to provide means whereby transverse cleats may be mounted on conveyor belts which cleats are not subject to deleterious results from sudden shocks or considerable overloading.

Further objects and advantages of my invention will be seen in the following description and drawings in which:

Figure 1 is an elevation in cross-section of my belt cleat support;

Figure 2 is a perspective view of my invention disclosing, in particular, the belt engaging surface thereof;

Figure 3 illustrates two of my belt cleat supports supporting one type of cleat;

Figure 4 illustrates a second type of cleat in conjunction with my invention; and Figure 5 illustrates a third type of cleat or bucket.

With reference to the drawings, particularly to Figure 1, the main body of my belt cleat support is indicated by numeral 10. This body may be formed of rubber, leather, hard pressed felt, certain plastics or other similarly resilient material. In the embodiment shown, this body is formed of rubber or rubber substitute and has an insert 11 securely embedded therein. Insert 11 is threaded to receive elevator bolt 12. The latter passes through a hole punched or drilled through the conveyor belt 13. This conveyor belt may be made of any of the usual material used for such betls, such as canvas, leather, rubber, other textile substances, or various combinations thereof. Main body 10 has a bore 14 molded therein, which bore is placed perpendicularly to the axis of elevator bolt 12 and insert 11. The purpose of said bore 14 will appear hereinafter.

As shown in Figures 1 and 2, the belt engaging surface 15 of my belt cleat support is of a particular structure. The inner concave portion is in the form of a truncated pyramid wherein the dimensions of the base thereof are less than the corresponding dimensions of the main body 10. Thus, as shown in Figure 1, the distance between the points or lines 16 is less than the distance between the two sides 17 of main body 10. The sides 17 terminate just short of the base and are then angled inwardly to meet the lines 16 as shown at 18.

In the preferred form of my invention, it has been found best to form the base lines 16 as sharply as may be accomplished, whereas the meeting point or line 19 of sides 17, may be rounded to facilitate the molding operation. It has also been found most advantageous to form base lines 16 at a sharp angle to each other as indicated at 20.

Thus in assembling my invention, as shown in Figure 3, two holes are punched or drilled transversely in lines across belt 13. Elevator bolts 12 are then inserted and driven home. Main body 10 is then placed over the end of the bolt 12 engaging threaded insert 11 therewith. Main body 10 is then turned as a nut until the belt engaging surface of my invention makes firm contact with the belt. The body 10 is turned also until the bore 14 is in the desired position with relation to the travel of the belt. As shown in Figure 3, the bore 14 is positioned parallel to the belt travel. The other belt cleat support is similarly affixed and then a cleat 21 is bolted at each end to the supports by means of bolts 22, or other desirable or suitable fasteners, passing through bores 14.

The cleat 21 is shown as a straight parallel plate of metal, wood, belt fabric, or any material desired by the user. It may also assume any shape so desired, either straight, as shown; channel-shaped as shown in Figure 4; bucket-shaped as shown in Figure 5; angular, cylindrical, or whatever shape may best meet the needs of the user.

The form of cleat shown in Figure 4, a channel-shaped material 23 secured to and over a pair of my belt cleat supports, may be used where particularly heavy or rough material may be conveyed. Such construction presents maximum strength while still preserving the resilient qualities afforded by my supports.

As indicated above, Figure 5 shows a bucket type of cleat, where cleat 24 may be made of belt material or other flexible substance. In this embodiment, it will be noted that main bodies 10 are oriented so that bores 14 are perpendicular to the line of belt travel.

It should be further pointed out that, when assembling my invention to the belt, body 10 is turned as a nut until a firm contact of base 15 is made with the belt 13. When the proper contact is made, the resilient material of the body 10 above the base lines 16 will be under compression and the straight or perpendicular portions of sides 17 will meet the belt surface as indicated at 25 in Figure 3. Being under such considerable compression, it is obvious that regardless of the normal flexure of the belt in passing over a pulley or roller, the base of the body 10 will maintain its close contact and thus will present no interstice between support and belt wherein any of the material being conveyed may lodge.

It should also be noted that cleats 21 and 23, Figures 3 and 4, may be mounted clear of the belt so that the cleats may be washed clean. With the supports mounted as just described and with a small space provided between the bottom of the cleat and the belt surface, it is apparent that no material can be so retained on the belt as to render it unsanitary.

While I have shown my invention generally square in plan and with the top formed as illustrated in order to conserve weight and material, it should be thoroughly understood that my belt cleat support may be generally rectangular in form with the top rounded, at right angles, or formed in any other shape.

It should also be understood that while I have shown my invention as applied to a conventional belt, it may also be used in combination with a chain belt where the use of my resilient cleat supports provide a shockproof mounting for a transversely disposed cleat or bucket. Such construction may well be used in the conveying of ore in mining operations, or other irregular or heavy objects. It is obvious that my invention is susceptible of some change and modification without departing from the spirit thereof. Therefore, it is to be understood that I do not limit myself to the precise arrangement and formation of parts illustrated and described.

Having thus described my invention, I claim:

1. In a conveyor having an endless belt, a belt cleat support comprising a body of resilient material, a threaded metallic insert contained within said body, fastening means comprising a substantially flat-headed bolt passing through said belt and threadedly engaging said insert for securing said body to said belt, means for securing a cleat to said cleat support, said body having a belt engaging surface formed with a concave portion whereby the edges of said concave portion are adapted to form a sanitary seal when said belt engaging surface is put under compression by said fastening means.

2. A belt cleat support as claimed in claim 1 wherein said belt engaging surface is formed with a concave portion in the shape of a truncated pyramid and said means for securing a cleat to said cleat support comprises a bore formed in said body removed from said metallic insert and disposed perpendicularly to the axis of said metallic insert.

References Cited in the file of this patent

UNITED STATES PATENTS

| | | |
|---|---|---|
| 415,434 | Baker | Nov. 19, 1889 |
| 1,327,296 | Solem | Jan. 6, 1920 |
| 2,094,789 | Gellatly | Oct. 5, 1937 |
| 2,264,332 | Peterson | July 31, 1941 |
| 2,305,044 | Toews | Dec. 15, 1942 |
| 2,704,150 | Scranton | Mar. 15, 1955 |
| 2,724,491 | Arendorff | Nov. 22, 1955 |

FOREIGN PATENTS

| | | |
|---|---|---|
| 519,079 | Great Britain | Mar. 15, 1940 |